(12) United States Patent
Friedrich et al.

(10) Patent No.: US 8,414,698 B2
(45) Date of Patent: *Apr. 9, 2013

(54) PIGMENT/AUXILIARY COMBINATION HAVING IMPROVED COLOUR PROPERTIES

(75) Inventors: Holger Friedrich, Krefeld (DE); Jürgen Kischkewitz, Ratingen (DE); Gerald Büchner, Krefeld (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/487,799

(22) Filed: Jul. 17, 2006

(65) Prior Publication Data

US 2007/0022914 A1  Feb. 1, 2007

(30) Foreign Application Priority Data

Jul. 27, 2005  (DE) .................. 10 2005 035 708

(51) Int. Cl.
- *C09C 3/08* (2006.01)
- *C09C 3/00* (2006.01)
- *C09C 3/10* (2006.01)
- *C09C 1/00* (2006.01)
- *C09C 1/24* (2006.01)
- *C09C 1/34* (2006.01)

(52) U.S. Cl.
USPC ........... 106/453; 106/447; 106/460; 106/499; 106/712

(58) Field of Classification Search ............... 106/447, 106/453, 460, 499, 712
See application file for complete search history.

(56) References Cited

U.S. PATENT DOCUMENTS

| | | | | |
|---|---|---|---|---|
| 5,059,250 | A * | 10/1991 | Burow et al. | 106/459 |
| 5,401,313 | A * | 3/1995 | Supplee et al. | 106/12 |
| 5,681,876 | A * | 10/1997 | Schneider et al. | 523/351 |
| 5,853,476 | A * | 12/1998 | Will | 106/712 |
| 5,961,710 | A * | 10/1999 | Linde et al. | 106/437 |
| 6,132,505 | A * | 10/2000 | Linde et al. | 106/429 |
| 6,547,870 | B1 * | 4/2003 | Griessmann et al. | 106/417 |
| 6,758,893 | B2 * | 7/2004 | McAulay et al. | 106/436 |
| 6,824,821 | B1 * | 11/2004 | Gillman et al. | 427/212 |
| 7,318,864 | B2 * | 1/2008 | Reisacher et al. | 106/499 |

OTHER PUBLICATIONS

Industrial Inorganic Pigments, edited by Gunter Buxbaum; Second, Completely Revised Edition 1998, Wiley-VCH, p. 9 [no month].*

* cited by examiner

*Primary Examiner* — Anthony J Green
(74) *Attorney, Agent, or Firm* — Nicanor A. Kohncke

(57) ABSTRACT

The present invention relates to a pigment/auxiliary combination having an improved chroma and/or relative color strength, to its production and to its use.

22 Claims, No Drawings

PIGMENT/AUXILIARY COMBINATION HAVING IMPROVED COLOUR PROPERTIES

BACKGROUND OF THE INVENTION

1. Field of the Invention

The present invention relates to a pigment/auxiliary combination having an improved chrome and/or relative colour strength, to its production and to its use.

Inorganic pigments are encountered in numerous areas of everyday life. They are used for colouring building materials such as concrete and asphalt, emulsion paints, other coating materials, plastics, and so on. Very often, however, the pigments are additionally coated subsequently, after the actual synthesis. The purpose of such coating is essentially to achieve further improvement in the qualities of the pigments.

2. Brief Description of the Prior Art

EP 0 199 975 A1 describes red iron oxide pigments having improved colouristic qualities, the isoelectric point of the pigments being greater than 7, with particular preference greater than 8. The pigments described in accordance with this teaching are required to have a coating, which is composed of colourless compounds of one or more elements from the group Mg, Zn, Al, La, Y, Zr, Sn, or Ca. Compounds suitable for the coating are low-solubility compounds of Mg, Ca, Al and/or Zn, and are applied to the pigment by spraying, painting and/or precipitation in aqueous phase. The process for producing these red iron oxide pigments is complex and necessitates continual monitoring of the isoelectric point. The process is extended to other iron oxide color pigments in DE 36 32 913 A1. The dlsadvanges of the prosess, however, remains the same.

EP 0 634 991 A1 describes surface-modified particles and also a process for producing them. The particles disclosed therein are similar to those from EP 0 199 975 A1. They differ only in a second coating with at least one dispersion promoter. Examples given of such promoters include ligninsulphonates and polyacrylates. The production of particles of this kind is always a multi-stage operation and is therefore extensive.

U.S. Pat. No. 6,758,893 B2 describes a process of producing extrusion granulates. In the sole example, iron oxide yellow pigments are used to colour a cement system. Although the problem the patent sought to solve was to produce rapidly dispersible granules, the cement coloured with iron oxide yellow granules is yellower but also considerably less colour strength. From the published $\Delta L^*$ values it can be concluded that the extrusion granules have approximately 10% to 15% less colour strength then the starting iron oxide yellow powder. The disclosed extrusion process therefore only delivers granules with less colour strength.

U.S. Pat. No. 5,853,476 A1 and/or EP 1 027 302 B1 describe a process to colour a cement system with compacted inorganic pigment granules, whereby the colouring effect of the compacted inorganic granules in the cement system exceeds that of the powder standard. Although the colourimity of the cement system is described in two examples, whereby the colorizing effect of the inorganic compacted pigment granules and the powder standard is documented with the help of a colour measuring system, no data on the colour values and colour strength is disclosed. Both disclosed examples merely describe the visual colour-matching of the testing specimens manufactured. The testing specimens coloured with the compacted inorganic pigment granules are described as "redder and lighter" in comparison to the powder standard in the case of a compacted iron oxide red granule and as "yellower and lighter" in comparison to an iron oxide yellow granule. These pigment granules have by their own account less colour strength then the original powder ("lighter"). A disadvantage of the described manufacturing process for the compacted inorganic pigment granules is also the relative high proportion of a dispersing agent of over 3 wt-% based on pigment, which at the same time also acts as a binder. Lignin sulphate is preferably used as a dispersing agent. This acts as a liquefier in concrete mixtures, affects the water-cement-relationship and affects the concrete consistency.

SUMMARY OF THE INVENTION

It was an object of the present invention, therefore, to provide a pigment/auxiliary combination which has improved chroma and/or relative colour strength in the application medium and can be produced by a simple process in one step using commercially customary organic auxiliaries.

This object has been achieved by means of a pigment/auxiliary combination comprising one or more inorganic pigments and one or more organic auxiliaries and having
a chroma difference $\Delta C_{ab}^*$, measured in CIELAB units in accordance with DIN 5033 and DIN 6174, of $\geq 1.5$, in particular $\geq 1.8$ and/or
a relative colour strength of $\geq 108$, in particular $\geq 110$, based on the pigment employed, without the auxiliary/ies used, in accordance with the building-material colour test.

The methods of measuring the calorimetric values and of calculating the chroma difference $\Delta C_{ab}^*$ and the relative colour strength are specified in the examples.

DETAILED DESCRIPTION OF THE INVENTION

The pigment/auxiliary combination preferably has a chroma difference $\Delta Cab^*$, measured in CIELAB units in accordance with DIN 5033 and DIN 6174, of $>1.5$, in particular $>1.8$ and a relative colour strength of $>95$ based on the pigment employed, without the auxiliary/ies used, in accordance with the building-material colour test. The pigment/auxiliary combination employs preferably, as inorganic pigments, chromatic pigments, more preferably iron oxide pigments, chromium oxide pigments and mixed-phase rutile pigments, or mixtures thereof. Under certain circumstances achromatic black pigments such as black iron oxide or carbon black (carbon pigments) or white pigments such as titanium dioxide or zinc oxide can be used as well.

The pigment/auxiliary combination comprises preferably, as organic auxiliary, products from the neomere® TINT series from Chryso, partly or fully hydrolysed polyvinyl alcohols, alkyl sulphates, alkylsulphonates, alkyl phosphates and alkylphosphonates in the form of their alkali metal salts, or mixtures thereof. Partly hydrolysed polyvinyl alcohols may be interpreted theoretically as a copolymer of vinyl alcohol with vinyl acetate.

In the pigment/auxiliary combination the organic auxiliaries are preferably added in an amount of 0.01% to 20% by weight, more preferably of 0.1% to 5% by weight, calculated in each case as active substance, based on the inorganic pigment(s). Since the organic auxiliaries are often used not in solid form but instead in the form of solutions, suspensions or emulsions, the above indications are understood to refer to the active substance.

The pigment/auxiliary combination preferably comprises further auxiliaries which promote processability. Further auxiliaries which promote processability are considered for the purposes of this invention to include emulsifiers, wetting agents, dispersing assistants, flow assistants, disintegration assistants or granule binders.

The pigment/auxiliary combination preferably has a residual water content of below 4% by weight, preferably below 2% by weight. This can be achieved optionally by means of subsequent drying. The method of determining the residual water content is specified in the examples.

The pigment/auxiliary combination is preferably in granule form. Granule in the context of the invention means any material whose average particle size has been enlarged as compared with the starting materials, by means of a treatment step. "Granule" therefore embraces not only spray granules and compacting granules but also, for example, products of wet or moist treatment with subsequent comminution, and products of dry or substantially dry processing steps, examples being dry-prepared granules, briquettes and the like.

The pigment/auxiliary combination is preferably in the form of bead granules. Bead granules can be obtained, for example through spray granulation (spray drying over a disk or nozzel) in the cocurrent or countercurrent process At least 85% of the granulated pigment/auxiliary combination preferably has a particle size of between 60 μm and 3000 μm, more preferably between 80 μm and 1500 μm.

The pigment/auxiliary combination preferably further comprises preservatives, defoamers, retention agents, rheology modifiers, antisettling agents and/or fragrances.

The invention also encompasses a process for producing a pigment/auxiliary combination, characterized in that conventionally prepared inorganic pigments are mixed with at least one organic auxiliary and the mixture is optionally dried and/or ground.

It is an advantage of the production process of the invention that there is no need for an aftertreatment substance to be applied by precipitation, let alone for a multi-stage synthesis process for the aftertreatment, when preparing the pigment/auxiliary combination of the invention.

The pigment/auxiliary combination of the invention can be produced either starting from the dry pigment or else in the wet phase (suspension or paste).

In the former case the conventionally prepared pigment is mixed with at least one organic auxiliary and the mixture is optionally ground. For the mixing of pigment and auxiliary it is possible to use all mixers known to the skilled person. Depending on the mixing assembly used it may also be advantageous in certain circumstances, during this procedure, to add on a mill, in order to obtain a complete and homogeneous pigment/auxiliary combination.

The conventionally prepared inorganic pigments in suspension or paste are preferably mixed with at least one organic auxiliary and the mixture is dried and optionally ground. In the case of preparation via the wet phase (suspension or paste) the auxiliary/ies can be added, after the actual pigment synthesis, at in principle any step in the process of working up and further-processing the pigment through to final conditioning; for example, after the filtration and washing of the pigment and before its drying.

The pigment suspension or paste is preferably a suspension from the pigment preparation operation. The addition of the auxiliary in the wet phase is particularly preferred, since in the suspension it is easily possible to add and mix in the auxiliary/ies.

The pigment suspension is preferably a redispersion of agglomerated particles. By redispersing particles which have already undergone agglomeration it is possible, starting from the pigment powder, to produce, specifically, a pigment suspension for reaction with the organic auxiliary/ies. This is followed by drying. For the drying step the skilled person has a range of assemblies available. Mention is made at this point only of duct dryers, belt dryers, platform dryers, cylinder dryers, drum dryers, tube dryers, paddle dryers, or else discontinuous chamber-tray dryers. Drying takes place preferably by means of spray drying or fluidized-bed drying.

Preference is given to using spray dryers (atomizing dryers) which operate with spraying discs or nozzles in a cocurrent or countercurrent process.

Depending on the drying assembly selected it may be necessary to include a subsequent grinding step. Grinding may be preceded or followed by an additional step of heat treatment as well.

It is not essential to the invention whether the combination of pigment and auxiliary is in powder form or in granulated form. If the pigment/auxiliary combination is to be produced in granulated form, then the customary techniques are suitable for this purpose. In accordance with the prior art, suitable production processes for pigment granules include spray granulation (spray drying via disc or nozzle) in a cocurrent or countercurrent process, size-enlargement granulation (mixer, fluid-bed granulator, plate or drum), compacting processes or extrusion processes. Combinations of these granulation processes are of course also conceivable. The selection of the appropriate granulation process depends on factors including that of whether the auxiliary has been added actually to the wet phase (suspension or paste) or to the pigment which has already undergone drying. In the former case the spray drying or extrusion process is appropriate, in the latter case the compacting process. The pigment/auxiliary combination is preferably subjected in the dry and optionally ground state to a subsequent granulation operation as well.

The invention also embraces the use of the pigment/auxiliary combination for colouring lime- and/or cement-bound building materials, such as, for example, concrete, cement mortar, render, lime sandstone or else for covering asphalt. In principle, however, the pigment/auxiliary combination produced in accordance with the invention is also suitable for colouring coating materials, including emulsion paints, and plastics.

The pigment/auxiliary combination is preferably mixed with the building materials in an amount of 0.1 to 10% by weight, based on cement, or based on the entire mixed material in the case of asphalt.

The pigment/auxiliary combination is preferably first suspended in water and then mixed with the building materials.

The subject matter of the present invention is apparent not only from the subject matter of the individual claims but also from the combination of the individual claims with one another. Similar comments apply to all of the parameters disclosed in the description and to their arbitrary combinations.

The examples which follow are used to illustrate the invention, without any intention by so doing that the invention should be restricted. The amounts given % by weight are based in each case on the pigment employed.

EXAMPLES

I. Description of the Measuring Methods Employed

I.1 Building-material Colour Test (BMCT)

The colorimetric values in building materials were tested in cement mortar by colorimetric measurement of prisms produced with white cement, the relevant data being as follows (based on DIN EN 12878: 2005, "Pigments to Colour Limestone and/or Building Materials Bound by Cement", Chapter 5.12):

Cement/quartz sand ratio 1:4, water/cement value 0.35, pigmentation level 1.2%, based on cement, mixer used from RK Toni Technik, Berlin, (DE), with 5l mixing bowl, model 1551, rotational speed 140 rpm, batch: 1200 g of quartz sand 0.1 to 1 mm, 600 g of quartz sand 1 to 2 mm, 200 g of fine limestone powder (<5% sieve residue on 90 μm screen), 500 g of white cement. The quartz sand fractions and the limestone powder are charged together to the mixing vessel. Then the pigment is added and the components are premixed for 10 s (mixer setting 1: slow). The water is then added to this mixture, ensuring that it is introduced in the middle of the mixture. After the water has seeped in, the cement is added and this composition is mixed (mixer setting 1: slow). After a mixing time of 100 s or 200 s a sample (600 g) is taken and used to produce a specimen (10×10×2.5 cm) under pressure (pressing force 114 kN for 2 seconds). Curing of the specimens to a finished slab: 24 hours at 30° C. and 95% relative humidity, with subsequent drying at 60° C. for 4 hours. Colour data measurement via Dataflash 2000 Datacolor International, 4 measurement points per slab (measurement geometry d/8°, luminant C/2° with gloss inclusion). The average values obtained are compared with the values of a reference sample. The parameters evaluated are the chroma difference $\Delta C_{ab}^*$ and the relative colour strength (reference sample=100%) (DIN 5033, DIN 6174).

For the purposes of this specification the following colorimetric abbreviations and calculations are used, as known from the CIELAB system:

a* is the red/green axis, with $\Delta a^* = a^*(\text{sample}) - a^*(\text{reference})$ b* is the yellow/blue axis, with $\Delta b^* = b^*(\text{sample}) - b^*(\text{reference})$ $C_{ab}^*$ is the chroma, where $(C_{ab}^*)^2 = (a^*)^2 + (b^*)^2$ $\Delta C_{ab}^*$ is the chroma difference, with $\Delta C_{ab}^* = C_{ab}^*(\text{sample}) - C_{ab}^*(\text{reference})$ L* is the luminance, with $\Delta L^* = L^*(\text{sample}) - L^*(\text{reference})$.

I.2 Relative Colour Strength

The relative colour strength in % is subject to the following equations:

$$\text{Relative colour strength in } = \frac{(K/S)_{sample}}{(K/S)_{reference}} \cdot 100$$

$$K/S = \frac{(1-\beta^*)^2}{2 \cdot \beta^*}$$

$$\beta^* = \frac{Y/100 - r_0}{1 - r_0 - r_2 \cdot (1 - Y/100)},$$

where $r_0=0.04$ and $r_2=0.6$, and Y is the tristimulus value (luminance).

Calculation takes place in general accordance with DIN 53 234.

I.3 Bulk Density

The bulk density was determined on ready-produced material without further treatment of the product, as the ratio of mass to volume.

I.4 Residual Moisture Content

The residual moisture content was determined by gently drying the pigment/auxiliary combination to constant weight.

I.5 Compressive Strength

The compressive strength was determined in general accordance with DIN EN 196-1. The parameter tested is the compressive strength of pigmented cement mortar in comparison to an unpigmented sample, for which the deviations should not be greater than specified in EN 12878 "Pigments for the colouring of building materials based on cement and/or lime" (a maximum of −8% for reinforced concrete).

I.6 Solidification Behaviour

The solidification behaviour was determined in general accordance with DIN EN 196-3. It involves comparison of the start and end of solidification of a cement paste with and without pigmentation,; the deviations should not be greater than as specified in EN 12878.

II. Example 1

10 kg of Bayferrox® 110 red iron oxide (commercial product of Lanxess Deutschland GmbH) were mixed intensely in a mixer with 2.5% by weight of neomere® TINT 317 (commercial product of Chryso, SAS) and the mixture was subsequently homogenized via a Bauermeister mill with a 3 mm screen insert.

The product obtained possessed a residual moisture content of 0.7% by weight and a bulk density of 0.40 g/cm³ and was incorporated as described above in accordance with the BMCT with a mixing time of 100 s. The slab produced was homogeneously coloured and had a colorimetry of $\Delta a^* = 1.0$, $\Delta b^* = 1.4$—corresponding to a chroma difference $\Delta C_{ab}^* = 1.7$—and a relative colour strength of 111%. The reference used was a slab which was also homogeneously mixed with the Bayferrox® 110 starting material, which was likewise ground via the Bauermeister mill with a 3 mm screen insert. The aftertreated sample is therefore substantially stronger in colour and substantially more saturated than the starting material.

III. Example 2

10 kg of Bayferrox® 110 red iron oxide were mixed intensely in a mixer with 2.0% by weight of Texapon® 842 (commercial product of Cognis Deutschland GmbH) and the mixture was subsequently homogenized via a Bauermeister mill with a 3 mm screen insert.

The product obtained possessed a residual moisture content of 0.5% by weight and a bulk density of 0.38 g/cm³ and was incorporated as described above in accordance with the BMCT with a mixing time of 100 s. The slab produced was homogeneously coloured and had a colorimetry of $\Delta a^* = 1.0$, $\Delta b^* = 1.4$—corresponding to a chroma difference $\Delta C_{ab}^* = 1.6$—and a relative colour strength of 108%. The reference used was a slab which was also homogeneously mixed with the Bayferrox® 110 starting material, which was likewise ground via the Bauermeister mill with a 3 mm screen insert. The aftertreated sample is therefore substantially stronger in colour and substantially more saturated than the starting material.

IV. Example 3

25 kg of a brown mixture of red and black iron oxides were slurried with 25 kg of water, with addition of 2.5% by weight of neomere® TINT 317. The suspension had a solids content of 48.1% and a pH of 5.1 and was dried on a nozzle spray dryer. The granules obtained are free-flowing and possessed a residual moisture content of 0.5% by weight and a bulk density of 1.08 g/cm³. Studies on compressive strength in general accordance with DIN EN 196-1 and on the solidification behaviour in general accordance with DIN EN 196-3 show that the requirements of standard EN 12878 are met even for reinforced concrete.

The granules were incorporated as described above in accordance with the BMCT, with a mixing time of 200 s. The slab produced was homogeneously coloured and had a colorimetry of $\Delta a^*=0.8$, $\Delta b^*=1.4$—corresponding to a chroma difference $\Delta C_{ab}^*=1.6$—and a relative colour strength of 110%. The reference used was the slab which was also homogeneously mixed with the brown mixture without addition of an auxiliary. The granules with admixed auxiliary are therefore substantially stronger in colour and substantially more saturated than the starting material. A relative colour strength difference and a chroma difference of this magnitude between the two slabs is visible even to the naked eye.

V. Example 4

25 kg of Bayferrox® 920 yellow iron oxide (commercial product of Lanxess Deutschland GmbH) were suspended in 37.5 kg of water and 1.5% by weight of a 40% strength aqueous solution of an Na polyacrylate and with 0.5% by weight of a partly hydrolysed polyvinyl alcohol of low molecular weight. The suspension had a solids content of 38.3% and a pH of 6.4 and was dried on a nozzle spray dryer. The granules obtained are free-flowing and possessed a residual moisture content of 0.7% by weight and a bulk density of 0.48 g/cm$^3$. Studies on compressive strength in general accordance with DIN EN 196-1 and on the solidification behaviour in general accordance with DIN EN 196-3 show that the requirements of standard EN 12878 are met even for reinforced concrete.

The granules were incorporated as described above in accordance with the BMCT, with a mixing time of 200 s. The slab produced was homogeneously coloured and had a colorimetry of $\Delta a^*=0.0$, $\Delta b^*=2.3$—corresponding to a chroma difference $\Delta C_{ab}^*=2.2$—and a relative colour strength of 102%. The reference used was a slab which was also homogeneously mixed with the Bayferrox® 920 powder without additions. The granules with admixed auxiliary are therefore substantially more chromatic than the starting material. A chroma difference of this magnitude between the two slabs is clearly visible even to the naked eye.

VI. Example 5

25 kg of Bayferrox® 920 yellow iron oxide were suspended in 37.5 kg of water and 1.5% by weight of a 40% strength aqueous solution of the sodium salt of polyaspartic acid and with 1.0% by weight of a partly hydrolysed polyvinyl alcohol of relatively high molecular weight. The suspension had a solids content of 38.6% and a pH of 5.9 and was dried on a nozzle spray dryer. The granules obtained are free-flowing and possessed a residual moisture content of 0.7% by weight and a bulk density of 0.49 g/cm$^3$. Studies on compressive strength in general accordance with DIN EN 196-1 and on the solidification behaviour in general accordance with DIN EN 196-3 show that the requirements of standard EN 12878 are met even for reinforced concrete.

The granules were incorporated as described above in accordance with the BMCT, with a mixing time of 200 s. The slab produced was homogeneously coloured and had a colorimetry of $\Delta a^*=0.3$, $\Delta b^*=3.8$—corresponding to a chroma difference $\Delta C_{ab}^*=3.8$—and a relative colour strength of 110%. The reference used was a slab which was also homogeneously mixed with the Bayferrox® 920 powder without additions. The granules with admixed auxiliary are therefore substantially more chromatic and more strongly coloured than the starting material. A relative colour strength difference and a chroma difference of this magnitude between the two slabs is clearly visible even to the naked eye.

VII. Example 6 (Comparative Example)

25 kg of Bayferrox® 920 yellow iron oxide were suspended in 37.5 kg of water and 1.5% by weight of a 40% strength aqueous solution of the sodium salt of polyaspartic acid. The suspension had a solids content of 38.3% and a pH of 6.3 and was dried on a nozzle spray dryer. The granules obtained are free-flowing and possessed a residual moisture content of 0.7% by weight and a bulk density of 0.54 g/cm$^3$. Studies on compressive strength in general accordance with DIN EN 196-1 and on the solidification behaviour in general accordance with DIN EN 196-3 show that the requirements of standard EN 12878 are met even for reinforced concrete.

The granules were incorporated as described above in accordance with the BMCT, with a mixing time of 200 s. The slab produced was homogeneously coloured and had a colorimetry of $\Delta a^*=0.2$, $\Delta b^*=0.9$—corresponding to a chroma difference $\Delta C_{ab}^*=0.9$—and a relative colour strength of 102%. The reference used was a slab which was also homogeneously mixed with the Bayferrox® 920 powder without addition. The granules are therefore colouristically comparable with the starting material.

VII. Example 7

6 kg of Bayferrox® 960 yellow/red iron oxide mixture (commercial product of Lanxess Deutschland GmbH) were mixed intensely in a mixer with 1.5% by weight of Neomere® TINT 305 (commercial product of Chryso, SAS) and with 1.5% by weight of a 20% strength aqueous solution of a partly hydrolysed polyvinyl alcohol having a relatively high molecular weight and the mixture was subsequently homogenized via a Bauermeister mill with a 3 mm screen insert.

The product obtained possessed a residual moisture content of 0.9% by weight and a bulk density of 0.26 g/cm$^3$ and was incorporated as described above in accordance with the BMCT with a mixing time of 100 s. The slab produced was homogeneously coloured and had a colorimetry of $\Delta a^*=0.5$, $\Delta b^*=1.4$—corresponding to a chroma difference $\Delta C_{ab}^*=1.5$—and a relative colour strength of 108%. The reference used was a slab which was also homogeneously mixed with the Bayferrox® 960 starting material, likewise was also ground via the Bauermeister mill with a 3 mm screen insert. The aftertreated sample is therefore substantially stronger in colour and substantially more saturated than the starting material.

VII. Example 8

25 kg of Bayferrox® 110 red iron oxide were mixed intensely in a mixer with 1.5% by weight of Neomere® TINT 317 and with 2.0% by weight of a 25% strength aqueous solution of a partly hydrolysed polyvinyl alcohol of low molecular weight. The mixture was comminuted via a 200/50P compactor (Bepex, Leingarten (DE)) at approximately 10 kN (2 kN/cm) and subsequently on a grinder (Frewitt, Fribourg, (CH)) with a screen having a mesh size of 1.25 mm. The comminuted product was sieved off via an Allgaier sieve machine with a mesh size of 250 μm. The fraction of the granulated oversize was approximately 82%.

The oversize obtained is free-flowing and possessed a residual moisture content of 1.0% by weight and a bulk density of 0.98 g/cm$^3$. Investigations on the compressive strength in general accordance with DIN EN 196-1 and on the solidification behaviour in general accordance with DIN EN 196-3 show that the requirements of standard EN 12878 are met even for reinforced concrete. The oversize was incorporated as described above in accordance with the BMCT, with a mixing time of 100 s. The slab produced was homogeneously coloured, colorimetry giving a $\Delta a^*=0.7$, $\Delta b^*=1.8$—corresponding to a chroma difference $\Delta C_{ab}^*=1.7$—and a relative colour strength of 103%. The reference used was a slab which was also homogeneously mixed with the Bayferrox® 110 starting material. The granulated oversize is therefore substantially more saturated than the starting material.

VIII. Example 9

20 kg of green chromium oxide GN (commercial product of Lanxess Deutschland GmbH) were suspended in 24.5 kg of water with 2.0% by weight of Neomere® TINT 317 and 0.5% by weight of a partly hydrolysed polyvinyl alcohol of low molecular weight. The suspension had a solids content of 46.0% and a pH of 6.7 and was dried on a nozzle spray dryer. The granules obtained are free-flowing and possessed a residual moisture content of 0.5% by weight and a bulk density of 1.52 g/cm³.

The granules were incorporated as described above in accordance with the BMCT, with a mixing time of 100 s and 200 s respectively. The slabs produced were homogeneously coloured and, for a mixing time of 100 s, colorimetry gave a $\Delta a^*=-0.9$, $\Delta b^*=1.4$—corresponding to a chroma difference $\Delta C_{ab}^*=1.7$—and a relative colour strength of 109%, while, for a mixing time of 200 s, colorimetry gave a $\Delta a^*=-1.3$, $\Delta b^*=1.6$—corresponding to a chroma difference $\Delta C_{ab}^*=2.1$—and a relative colour strength of 114%. The reference used was in each case the slab likewise homogeneously coloured with the green chromium oxide GN powder used, without additions, with a mixing time of 100 s and 200 s respectively. The granules with admixed auxiliary are therefore substantially more chromatic and more strongly coloured then the starting material. A relative colour strength difference and a chroma difference of this magnitude between the two slabs at 100 s mixing time and between the two slabs at 200 s mixing time s is clearly visible to the naked eye.

IX. Example 10 (Comparative Example)

20 kg of green chromium oxide GN were suspended in 24.5 kg of water and 2.0% by weight of a 40% strength aqueous solution of sodium polyacrylate. The suspension had a solids content of 46.0% and a pH of 8.3 and was dried on a nozzle spray dryer. The granules obtained are free-flowing and possessed a residual moisture content of 0.5% by weight and a bulk density of 1.48 g/cm³.

The granules were incorporated as described above in accordance with the BMCT, with a mixing time of 100 s and 200 s respectively. The slabs produced were homogeneously coloured and, for a mixing time of 100 s, colorimetry gave a $\Delta a^*=\pm 0.0$, $\Delta b^*=0.2$—corresponding to a chroma difference $\Delta C_{ab}^*=0.2$—and a relative colour strength of 103%, while, for a mixing time of 200 s, colorimetry gave a $\Delta a^*=0.1$, $\Delta b^*=0.3$—corresponding to a chroma difference $\Delta C_{ab}^*=0.3$—and a relative colour strength of 105%. The reference used was in each case the slab likewise homogeneously coloured with the green chromium oxide GN powder used, without additions, with a mixing time of 100 s and 200 s respectively. The granules are therefore colouristically comparable with the starting material.

All results are summarized in Table 1.

TABLE 1

| | Example | | | | | | | | | |
|---|---|---|---|---|---|---|---|---|---|---|
| | 1[1] | 2[1] | 3[2] | 4[2] | 5[2] | CE 6[2] | 7[1] | 8[1] | 9[1/2] | CE 10[1/2] |
| $\Delta a^*$ | 1.0 | 1.0 | 0.8 | 0.0 | 0.3 | 0.2 | 0.5 | 0.7 | −0.9/−1.3 | 0.0/0.1 |
| $\Delta b^*$ | 1.4 | 1.4 | 1.4 | 2.3 | 3.8 | 0.9 | 1.4 | 1.8 | 1.4/1.6 | 0.2/0.3 |
| $\Delta L^*$ | −1.1 | −0.9 | −1.0 | −0.3 | −0.9 | −0.2 | −0.9 | −0.4 | −1.0/−1.4 | −0.3/−0.5 |
| $\Delta C_{ab}^*$ | 1.7 | 1.6 | 1.6 | 2.2 | 3.8 | 0.9 | 1.5 | 1.7 | 1.7/2.1 | 0.2/0.3 |
| Relative colour strength 0 | 111 | 108 | 110 | 102 | 110 | 102 | 108 | 103 | 109/114 | 103/105 |
| Bulk density (g/cm³) | 0.4 | 0.38 | 1.08 | 0.48 | 0.49 | 0.54 | 0.26 | 0.98 | 1.52 | 1.48 |
| Residual moisture content (% by weight) | 0.7 | 0.5 | 0.5 | 0.7 | 0.7 | 0.7 | 0.9 | 1.0 | 0.5 | 0.5 |
| Compressive strength | not tested | not tested | complies | complies | complies | complies | not tested | complies | not tested | not tested |
| Solidification behaviour | not tested | not tested | complies | complies | complies | complies | not tested | complies | not tested | not tested |
| pH (suspension) | — | — | 5.1 | 6.4 | 5.9 | 6.3 | — | — | 6.7 | 8.3 |

[1] for 100 s mixing time
[2] for 200 s mixing time

What is claimed is:

1. A pigment/auxiliary combination consisting essentially of:
   one or more chromatic pigments selected from chromatic iron oxide pigments, chromatic chromium oxide pigments, and chromatic mixed-phase rutile pigments, and
   one or more organic auxiliaries selected from the group consisting of partly or fully hydrolysed polyvinyl alcohols, modified carboxylates, alkyl sulphates, alkyl sulphonates, alkyl phosphates and alkyl phosphonates in the form of their alkali metal salts or mixtures thereof, where the organic auxiliaries are added in an amount of 0.01% to 20% by weight calculated as an active substance based on the inorganic pigment(s);
   wherein said pigment/auxiliary combination has either:
   a) a relative colour strength of greater than or equal to 108%, based on the pigment employed without the organic auxiliaries as determined by a building-material colour test, or
   b) a chroma difference, $\Delta C_{ab}^*$, measured in CIELAB units in accordance with DIN 5033 and DIN 6174 of greater than or equal to 1.5 and a relative colour strength of greater than or equal to 95%, based on the pigment employed without the organic auxiliaries as determined by a building-material colour test; and
   further wherein
   said pigment/auxiliary combination is produced by a process selected from the group consisting of spray granulation, enlargement granulation and compacting granulation, and where said pigment/auxiliary combination is in granule form and is homogeneous.

2. The pigment/auxiliary combination according to claim 1, wherein:
the chroma difference $\Delta C_{ab}*$, measured in CIELAB units in accordance with DIN 5033 and DIN 6174, is >1.8, and/or
the relative colour strength is >110%, based on the pigment employed without the organic auxiliaries as determined by the building-material colour test.

3. The pigment/auxiliary combination according to claim 1, wherein the pigment/auxiliary combination further consists essentially of non-organic auxiliaries which promote processability.

4. The pigment/auxiliary combination according to claim 1, wherein the pigment/auxiliary combination has a residual water content of below 4% by weight.

5. The pigment/auxiliary combination according to claim 1, wherein the granule form is in the form of bead granules.

6. The pigment/auxiliary combination according to claim 1, wherein at least 85% of the pigment/auxiliary combination has a particle size of between 60 μm and 3000 μm.

7. The pigment/auxiliary combination according to claim 1, wherein the pigment/auxiliary combination further consists essentially of preservatives, defoamers, retention agents, rheology modifiers, antisettling agents, fragrances or combinations thereof.

8. The pigment/auxiliary combination according to claim 1, wherein the organic auxiliaries are added in an amount of 0.1% to 5% by weight, calculated in each case as active substance based on the one or more chromatic pigments.

9. The pigment/auxiliary combination according to claim 1, wherein the pigment/auxiliary combination has a residual water content of below 2% by weight.

10. The pigment/auxiliary combination according to claim 1, wherein at least 85% of the pigment/auxiliary combination has a particle size of between 80 μm and 1500 μm.

11. A process for producing the pigment/auxiliary combination according to claim 1, comprising:
mixing the one or more chromatic pigments with the one or more organic auxiliaries to form a mixture.

12. The process according to claim 11, further comprising:
additionally drying and/or grinding said mixture, and
wherein said mixing step further comprises mixing the one or more chromatic pigments in suspension or paste with the one or more organic auxiliaries.

13. The process according to claim 12, wherein the suspension or paste is from a pigment preparation operation.

14. The process according to claim 12, wherein the pigment suspension is a redispersion of agglomerated particles.

15. The process according to claim 11, further comprising:
drying and/or grinding the mixture.

16. The process according to claim 15, wherein said drying is by means of spray drying or fluidized-bed drying.

17. The process according to claim 15, wherein the mixture is subsequently subjected to additional granulation processes selected from the group consisting of spray granulation, enlargement granulation and compacting granulation.

18. A process for coloring lime- and/or cement-bound building materials or asphalt, comprising:
mixing the pigment/auxiliary combination according to claim 1 with the lime- and/or cement-bound building materials or asphalt.

19. The process according to claim 18 wherein the cement-bound building materials are cement mortar, render or lime sandstone.

20. A method for colouring building materials or asphalt, comprising:
mixing the pigment/auxiliary combination according to claim 1 with the building materials to form a mixture, wherein the pigment/auxiliary combination is mixed in an amount of 0.1% to 10% by weight, based on cement, or based on the entire mixture in the case of asphalt.

21. The method according to claim 20, further comprising:
mixing the pigment/auxiliary combination in water to form a suspension and then mixing the suspension with building materials or asphalt.

22. The method according to either claim 20 or 21, wherein the building materials are cement mortar, render or lime sandstone.

* * * * *